United States Patent [19]

McCoy et al.

[11] Patent Number: 4,838,082
[45] Date of Patent: Jun. 13, 1989

[54] FUEL GAUGE DAMPER CIRCUIT

[75] Inventors: Blane K. McCoy, Madison; James R. Garrison, Hazelgreen, both of Ala.

[73] Assignee: Chrysler Motors Corporation, Highland Park, Mich.

[21] Appl. No.: 144,217

[22] Filed: Jan. 15, 1988

[51] Int. Cl.⁴ .............................................. G01F 23/36
[52] U.S. Cl. ........................................ 73/313; 73/113; 330/253
[58] Field of Search .................. 73/113, 313; 330/253, 330/255, 277, 293, 300

[56] References Cited

U.S. PATENT DOCUMENTS

| | | | |
|---|---|---|---|
| 2,356,617 | 8/1944 | Rich | 171/95 |
| 3,638,115 | 1/1972 | Grundy | 324/125 |
| 3,649,911 | 3/1972 | Swanson | 324/125 |
| 3,727,182 | 4/1973 | Snyder | 340/59 |
| 3,938,117 | 2/1976 | Bozoian | 340/244 |
| 4,194,165 | 3/1980 | Skulski | 330/255 |
| 4,250,750 | 2/1981 | Martinec et al. | 73/308 |
| 4,402,048 | 8/1983 | Tsuchida et al. | 364/442 |
| 4,470,296 | 9/1984 | Kobayashi et al. | 73/113 |
| 4,497,205 | 2/1985 | Zulauf et al. | 73/313 |
| 4,542,348 | 9/1985 | Lucas et al. | 330/255 |
| 4,760,736 | 8/1988 | Huynh | 73/313 |

Primary Examiner—William A. Cuchlinski, Jr.
Assistant Examiner—Diego F. F. Gutierrez
Attorney, Agent, or Firm—Mark P. Calcaterra

[57] ABSTRACT

A fuel gauge damper circuit takes a variable resistance signal from a fuel tank sending unit, develops an input voltage proportional to the variable resistance and generates a filtered average of the input voltage at the fuel gauge output. The circuit damps undesirable large swings in the input voltage caused by "sloshing" in the fuel tank. Additionally, the damper circuit features power-up initialization apparatus for eliminating erroneous gauge indications which would otherwise occur upon the initiation of vehicle engine cranking.

2 Claims, 1 Drawing Sheet

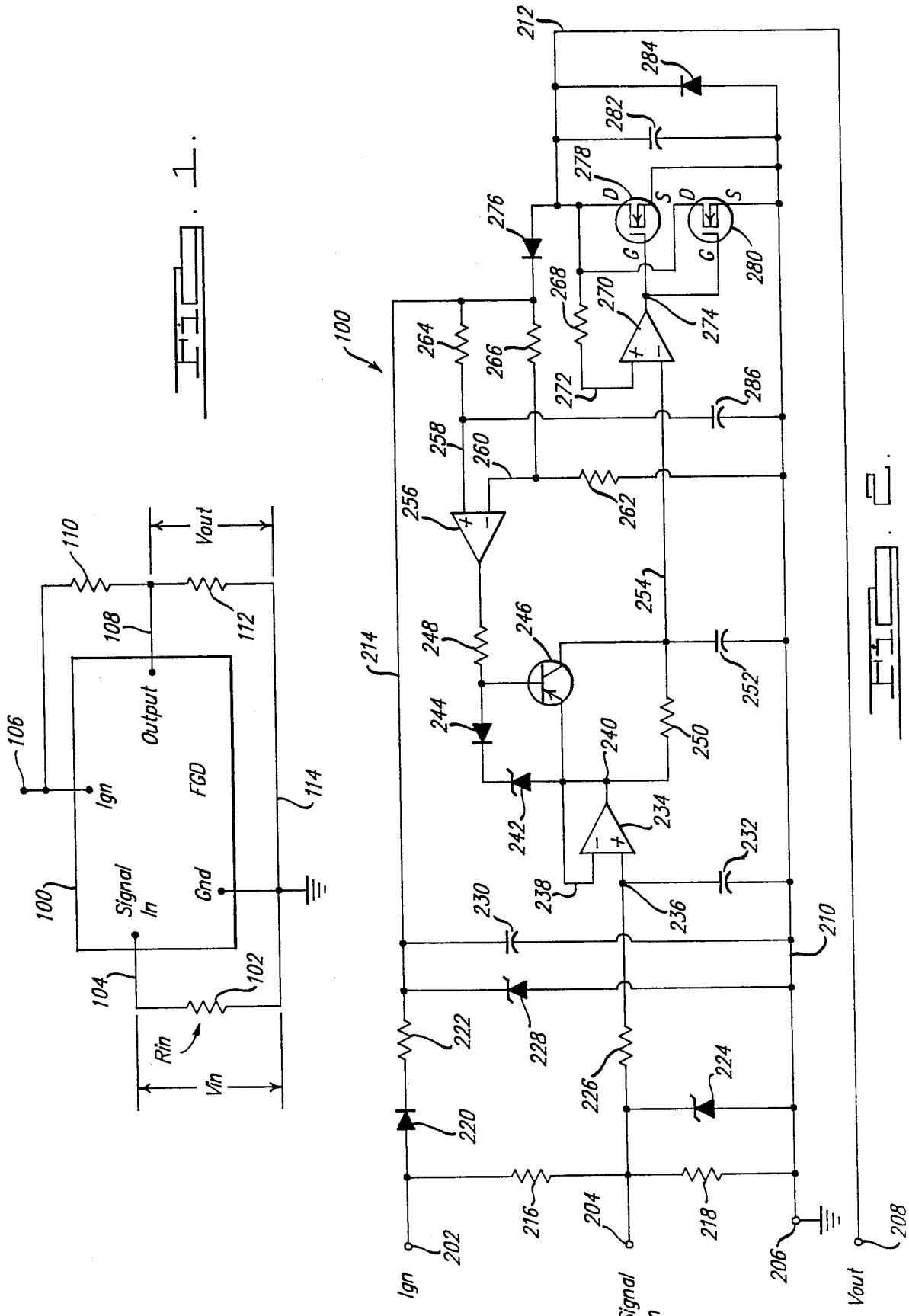

FUEL GAUGE DAMPER CIRCUIT

BACKGROUND OF THE INVENTION

The invention generally relates to circuitry for damping or averaging signal fluctuations driving a fuel gauge. More specifically, the invention concerns a damping circuit to be placed between the variable resistance output of a fuel tank sending circuit and the driving input to a fuel gauge.

False fuel gauge indications in vehicles such as automobiles are often generated as a result of the vehicle's acceleration, going uphill or downhill, cornering or undergoing any other operation that causes the fuel to "slosh" about or otherwise vary in a highly transient manner. Known approaches to dealing with the "sloshing" problem appear to involve relatively complex arrangements such as utilization of microcomputers for averaging the analog level readings obtained from the tank sender circuit. Related known patents in this area are the following U.S. Pat. Nos.: 4,402,048; 4,497,205; 4,470,296; 4,250,750; 3,938,117; 3,727,182; 3,649,911; 3,638,115; and 2,356,617.

U.S. Pat. No. 4,402,048—Tsuchida et al discloses a microcomputer-based system for indicating fuel quantity wherein the limit values about a center reading are used to discriminate against abnormal sudden changes caused by sloshing.

U.S. Pat. No. 4,497,205—Zulauf et al discloses a liquid level sensor using a variable flux generating coil to indicate the level. The monitoring circuit includes a filter means which reduces the response of the circuit to transient indications caused by sloshing.

U.S. Pat. No. 4,470,296—Kobayashi et al discloses a fuel gauge wherein the fuel level signal is averaged over time intervals which vary according to whether the fuel level is "stable" or "unstable". When the fuel level is deemed unstable the averaging time interval is selected to be longer than that used when the fuel level is stable. Stability is determined by a variety of vehicle sensors, such as speed sensors.

U.S. Pat. No. 4,250,750—Martinec et al discloses a liquid level measuring system wherein a microprocessor drives a bar graph type display. The microprocessor program compares each sample to a last sample and does not alter the bar graph display output unless several consecutive samples indicate a need to alter the displayed gauge indication.

U.S. Pat. No. 3,727,182—Snyder teaches a dual sensor monitoring and signal warning circuit for indicating a low brake fluid level in either reservoir of a split master brake cylinder. A resistive-capacitive time delay prevents energization of a warning lamp to prevent flickering in the event of brake fluid sloshing.

U.S. Pat. No. 3,398,117—Bozoian, similar to the '182—Snyder Patent, concerns a critical liquid level warning circuit with delay interposed to prevent a false low fuel warning in the event of fuel sloshing.

U.S. Pat. No. 3,649,911—Swanson teaches a meter driver circuit for improving meter responsiveness. The invention is directed principally to a circuit for initially overdriving a meter to overcome friction and inertia of the meter movement.

U.S. Pat. No. 3,638,115—Grundy discloses a meter jitter minimizing circuit.

U.S. Pat. No. 2,356,617—Rich discloses circuitry for providing sudden capacitive current in-rush to speed the response of a meter movement.

There is a need for a relatively simple and economical circuit for damping undesirable variations in input signals from a fuel tank sending unit prior to sending the filtered indicator signals to a utilization device such as an air core magnetic fuel indicating gauge.

SUMMARY OF THE INVENTION

Accordingly, a fuel gauge damper circuit for supplying an indicator signal to a fuel gauge of a vehicle comprises a damper circuit input coupled for receipt of a signal from a fuel tank sender. A bias potential means coupled to a power supply of the vehicle generates a predetermined bias potential at an output thereof. A variable input voltage generating means is coupled to the damper circuit input and to the bias potential means and is operative to generate a damper circuit input voltage which varies proportionally to the fuel tank sender signal. A filtering means receives the variable input voltage and generates an indicator signal comprising a filtered time average of the variable input voltage for presentation to the fuel gauge of the vehicle.

BRIEF DESCRIPTION OF THE DRAWING

The objects and features of the invention will become apparent from a reading of a detailed description of a preferred embodiment taken in conjunction with the drawing, in which:

FIG. 1 is a functional block diagram setting forth the system connections for a damper circuit designed in accordance with the principles of the invention; and FIG. 2 is a circuit schematic diagram setting forth the details of the fuel gauge damper circuit of FIG. 1.

DETAILED DESCRIPTION

As seen from FIG. 1, a fuel gauge damper 100 receives a resistive input signal from a fuel tank sending unit (not shown).

In general, the operation of a typical fuel tank sender involves a float that rides on the surface of the fuel and is therefore displaced upward or downward depending on the fuel level. The float is mechanically coupled to a sliding electrical contact which wipes over a stationary resistive element coupled between ground potential and the fuel tank sender output. Hence a variable resistance output is generated in accordance with the position of the float. This variable resistance 102, also designated as $R_{in}$, when combined with the input resistance of damper circuit 100 forms, in conjunction with the vehicle power supply presented at terminal 106 also designated IGN, an input voltage $V_{in}$. During vehicle acceleration, cornering and other maneuvers, fuel slosh inside the fuel tank may give rise to wide fluctuations in the sending unit output resistant signal which in turn causes large variations of $V_{in}$. The voltage available at the damper output 108 is a filtered average of the input voltage $V_{in}$. The output voltage is loaded as shown in FIG. 1 and is capable of sinking the quantity of current necessary to drive an output load such as a magnetic gauge.

Input resistance 102 is coupled between a ground supply at 114 and an input terminal 104. An input bias voltage derived from the vehicle's power system is presented to the damper circuit 100 at terminal 106, while an output terminal 108 is coupled to the junction of output loading resistors 110 and 112. A second terminal of resistor 110 is coupled to bias potential supply at terminal 106, while a second terminal of output resistor 112 is coupled to ground potential via path 114.

The details of the circuit arrangement for the fuel gauge damper 100 of FIG. 1 are set forth in the circuit schematic of FIG. 2. A resistive input signal from the fuel tank sender circuit is presented to the circuit of FIG. 2 across SIGNAL IN terminal 204 and ground terminal 206. Input resistor 218 is coupled between input terminal 204 and ground terminal 206, while input resistor 216 is coupled between terminal 202 coming from the ignition switch and input terminal 204. Coupled in parallel with input resistor 218 is a regulating zener diode 224. A bias reference potential for the circuit 100 is developed at lead 214 by means of diode 220 series connected with resistor 222 between the ignition at 202 and lead 214, along with a regulating zener diode 228 and filter capacitor 230 which are connected in parallel between bias output at 214 and ground potential at path 210.

An input buffer amplifier 234 is comprised, for example, of an operational amplifier type LM 2902, commercially available from a number of sources, such as Motorola, Inc. Buffer amplifier 234 has a non-inverting input 236 coupled to an input filter circuit comprising a resistor 226 having a first terminal coupled to input terminal 204 and a second terminal coupled to input 236 of amplifier 234. The filter circuit additionally includes capacitor 232 which is coupled between input 236 and ground potential at lead 210. An inverting input 238 of buffer amplifier 234 is coupled to the amplifier output 240.

Output 240 of input buffer amplifier 234 is coupled to a first terminal of resistor 250 which has a second terminal coupled to a first terminal of capacitor 252 and to an inverting input of an output amplifier 270 via path 254. The combination of resistor 250 and capacitor 252 forms a filtering or time delay RC network for the input voltage appearing at output 240 of buffer amplifier 234. The filtered signal across capacitor 252 is presented to the inverting input of operational amplifier 270, which may also be comprised of type LM 2902. Amplifier 270 additionally has a non-inverting input 272 coupled to a first terminal of a feedback resistor 268. The output 274 of amplifier 270 is commonly coupled to the gate electrodes of insulated gate field effect transistors 278 and 280. The drain electrodes of 278 and 280 are commonly coupled to a second terminal of feedback resistor 268, while the source electrodes of transistors 278 and 280 are commonly coupled to ground potential at path 210. The drain electrodes of transistors 278 and 280 are additionally coupled to the output terminal 208 of the fuel gauge damper circuit.

Transient suppression and protection is provided at the output 208 of circuit 100 by capacitor 282 and diode 284 coupled in parallel between the output terminal 208 and ground at path 210. Capacitor 282 also helps prevent the output signal of amplifier 270 from going into oscillation. Additional output transient suppression is provided by diode 276 which has an anode electrode coupled to output 208 via path 212 and a cathode electrode coupled to the bias supply at path 214. Diode 276 therefore provides a path back to zener diode 228 and capacitor 230 in the presence of a potentially large voltage transient at path 212 to clamp any such transient to a safe level determined by zener diode 228.

An initialization circuit arrangement for the fuel gauge damper 100 of FIG. 2 is generally comprised of operational amplifier 256 (also of type LM 2902) and transistor 246, along with timing resistor 264 and timing capacitor 286. A non-inverting input 258 of amplifier 256 is coupled via resistor 264 to bias potential at path 214. Additionally, input 258 is coupled to ground at path 210 via initializing capacitor 286. A second terminal of resistor 264, which is coupled to bias supply voltage at 214, is additionally coupled to the cathode electrode of diode 276. Additionally, the cathode electrode of diode 276 is coupled to a first terminal of resistor 266. Resistor 266 has a second terminal coupled to an inverting input 260 of amplifier 256 and to a first terminal of resistor 262. A second terminal of resistor 262 is coupled to ground potential at path 210. Amplifier 256 has an output coupled to an output resistor 248 at one terminal thereof.

A second terminal of resistor 248 is coupled to a base electrode of PNP transistor 246. The base electrode of transistor 246 is coupled to an anode terminal of diode 244. The cathode electrode of diode 244 is coupled to a cathode electrode of zener diode 242, which has an anode electrode coupled to output 240 of input buffer amplifier 234, an emitter electrode of transistor 246 and input 238 of amplifier 234. The collector electrode of transistor 246 is coupled to line 254 and to one side of capacitor 252 and resistor 250.

During normal operation of the fuel gauge damper circuitry, after the ignition system has been running for some time, the operation of the circuit of FIG. 2 is as follows. A resistive input at terminal 204 will give rise to a voltage at terminal 204 equal to the input voltage which is proportional to the changing resistance presented by the fuel tank sender. The input voltage is based on the voltage available from the ignition system at terminal 202. Assuming there are no significant leakage or input bias currents associated with capacitor 232 or operational amplifier 234, the input voltage will also be presented at points 236 and 240, the output of input buffer amplifier 234. After a time determined by the RC time constant established by resistor 250 and capacitor 252, capacitor 252 will be charged via resistor 250 to a value approximately equal to the input voltage appearing at terminal 240. The combination of operational amplifier 270 and transistors 278 and 280 form a unity gain voltage output amplifier with increased output current capability suitable for driving, for example, an air core magnetic fuel gauge.

If the input resistance changes with the change in resistive signal received from the fuel sending circuit, then the input voltage also will change. However, due to the relatively large time constant associated with resistor 250 and capacitor 252, the input voltage changes will not appear immediately at output terminal 208, but rather at some later time after capacitor 252 has had time to charge to the new level of input voltage. If the input resistance is constantly changing (and this is precisely the case for the output of a typical fuel sender unit) then resistor 250 and capacitor 252 essentially act as a large filter to smooth the input signal voltage variations. The resultant voltage at the output terminal 208 is then essentially a filtered time average of the input voltage.

When the vehicle ignition is first turned on, it is undesirable to delay the fuel gauge reading by the large time period introduced by the filter circuit of resistor 250 and capacitor 252. Therefore, on a power-up or ignition turn-on situation when the engine first begins to crank, circuitry is desired for altering the characteristics of the filter comprising resistor 250 and capacitor 252. This feature is provided in the following manner. At power-up, capacitor 286 is initially discharged and will immediately begin charging through resistor 264 when a bias potential at path 214 first appears, due to the turning on of the ignition switch. As long as the voltage at input 258 to amplifier 256 is lower than the voltage at input 260 to amplifier 256, then the output of operational amplifier 256 will assume a logic low state, thereby turning on transistor 246 such that a high conductivity or low impedance condition is presented across its emitter-collector terminals. In the high conductivity state, transistor switch 246 effectively shorts out or bypasses filter resistor 250 thereby enabling capacitor 252 to charge up substantially instantaneously to the input voltage appearing at buffer amplifier output 240. After a suitable delay period determined by the time constant associated with resistor 264 and capacitor 286 and the voltage at amplifier input 260 determined by resistors 262 and 266, capacitor 286 will charge to a level such that input 258 of amplifier 256 will be higher than the potential appearing at input 260 thereby forcing the output of operational amplifier 256 to a logic high condition, which, in turn, will place transistor 246 in the off state or high impedance condition between its emitter and collector terminals. Under these conditions, filter capacitor 252 will be charged through resistor 250 and the output voltage at terminal 208 will be a filtered average of the input voltage. The incorporation of the above described power-on or initialization circuitry eliminates erroneous gauge indications which would otherwise occur immediately following ignition switch turn on and vehicle cranking.

The invention has been described in connection with a detailed description of a preferred embodiment. The details of the description are for the sake of example only and the invention is to be interpreted in scope and spirit in accordance with the appended claims.

What is claimed is:

1. A fuel gauge damper circuit for supplying an indicator signal to a fuel gauge of a vehicle comprising:
  a damper circuit input coupled for receipt of a variable resistance signal from a fuel tank sender;
  bias potential means coupled to an ignition switch of the vehicle for receipt of power from a vehicle power supply whenever the ignition switch is placed in a predetermined position, the bias potential means operative to generate the predetermined bias potential level at its output;
  a resistive input circuit coupled to the ignition switch and the damper circuit input, operative to generate at its output a damper circuit input voltage varying proportionally with the variable resistance fuel tank sender signal;
  filter means including a charging resistor having a first terminal coupled to the output of the resistive input circuit, and a charging capacitor coupled between a second terminal of the charging resistor and ground potential, the filtering means operative to generate the indicator signal across the charging capacitor; and
  initializing means comprising:
    an initializing resistor with a first terminal coupled to the bias potential means output
    an initializing capacitor having a first terminal coupled to a second terminal of the initializing resistor and a second terminal coupled to ground potential;
    first and second series-coupled bias resistors coupled between the bias potential means output and ground potential;
    an operational amplifier comparator having a first input coupled to the first terminal of the initializing capacitor and a second input coupled to the junction of the first and second bias resistors; and
    a transistor switch having a base electrode coupled to an output of the operational amplifier comparator, and an emitter electrode coupled to the first terminal of the charging resistor and a collector electrode coupled to the second terminal of the charging resistor.

2. A fuel gauge damper circuit for supplying an indicator signal to a fuel gauge of a vehicle comprising:
  a damper circuit input coupled for receipt of a variable resistance signal from a fuel tank sender;
  bias potential means coupled to an ignition switch of the vehicle for receipt of power from a vehicle power supply whenever the ignition switch is placed in a predetermined position, the bias potential means operative to generate the predetermined bias potential level at its output;
  a resistive input circuit coupled to the ignition switch and the damper circuit input, operative to generate at its output a damper circuit input voltage varying proportionally with the variable resistance fuel tank sender signal;
  filter means including a charging resistor having a first terminal coupled to the output of the resistive input circuit, and a charging capacitor coupled between a second terminal of the charging resistor and ground potential, the filtering means operative to generate the indicator signal across the charging capacitor;
  an output buffer amplifier having an input coupled to the second terminal of the charging resistor and an output coupled to an output of the fuel gauge damper circuit for carrying the indicator signal;
  wherein the output buffer amplifier comprises an operational amplifier having a first input coupled to the output of the input buffer amplifier and a second input coupled by a feedback resistor to the output of the output buffer amplifier, and first and second field effect transistors with gate electrodes of the first and second transistors commonly coupled to an output of the operational amplifier, drain electrodes of the first and second transistors commonly coupled to the input of the operational amplifier and source electrodes of the first and second transistors commonly coupled to ground potential.

* * * * *